US006549589B1

United States Patent
Tsuruoka

(10) Patent No.: US 6,549,589 B1
(45) Date of Patent: Apr. 15, 2003

(54) DIGITAL AUDIO BROADCASTING RECEIVER

(75) Inventor: Tatsuya Tsuruoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/252,777

(22) Filed: Feb. 19, 1999

(30) Foreign Application Priority Data

Feb. 27, 1998 (JP) ........................................... 10-046482

(51) Int. Cl.[7] .............................................. H04L 27/06
(52) U.S. Cl. ..................... 375/343; 375/354; 375/355; 375/367; 370/210; 370/503; 708/404; 708/422
(58) Field of Search ................................. 375/343, 354, 375/355, 359, 363, 362, 142, 143, 150, 152, 367; 370/204, 210, 224, 503, 509, 512, 519, 208, 515; 714/12; 708/314, 402, 403, 404, 405, 422, 426

(56) References Cited

U.S. PATENT DOCUMENTS

| | | | | |
|---|---|---|---|---|
| 5,946,292 A | * | 8/1999 | Tsujishita et al. ........... 370/204 |
| 6,047,034 A | * | 4/2000 | Tsuruoka ..................... 375/343 |
| 6,058,101 A | * | 5/2000 | Huang et al. ................ 370/208 |
| 6,192,056 B1 | * | 2/2001 | Tsuruoka ..................... 370/504 |

* cited by examiner

Primary Examiner—Shuwang Liu
(74) Attorney, Agent, or Firm—Jay H. Maioli

(57) ABSTRACT

A DAB (Digital Audio Broadcasting) receiver includes a delay circuit for delaying a received DAB signal by a prescribed period, a correlation circuit for taking correlation between a delayed output of the delay circuit and the DAB signal, a moving average circuit for moving-averaging a correlation output of the correlation circuit over a width that is equal to a guard period, a peak detection circuit for detecting a position in time of a peak of a moving average output of the moving average circuit, a calculation circuit for calculating an error in a reception frequency based on a phase deviation in the DAB signal at the position in time that is indicated by a peak detection output of the peak detection circuit, an FFT (Fast Fourier Transform) circuit for subjecting the DAB signal to FFT processing, and a detection circuit for determining a reception center frequency based on an FFT output of the FFT circuit. The error in the reception frequency is corrected by controlling a local oscillation frequency based on a calculation output of the calculation circuit. An error in the reception frequency is corrected by performing carrier shifting based on a detection output of the detection circuit. As a result, the time necessary for tuning can be shortened.

3 Claims, 5 Drawing Sheets

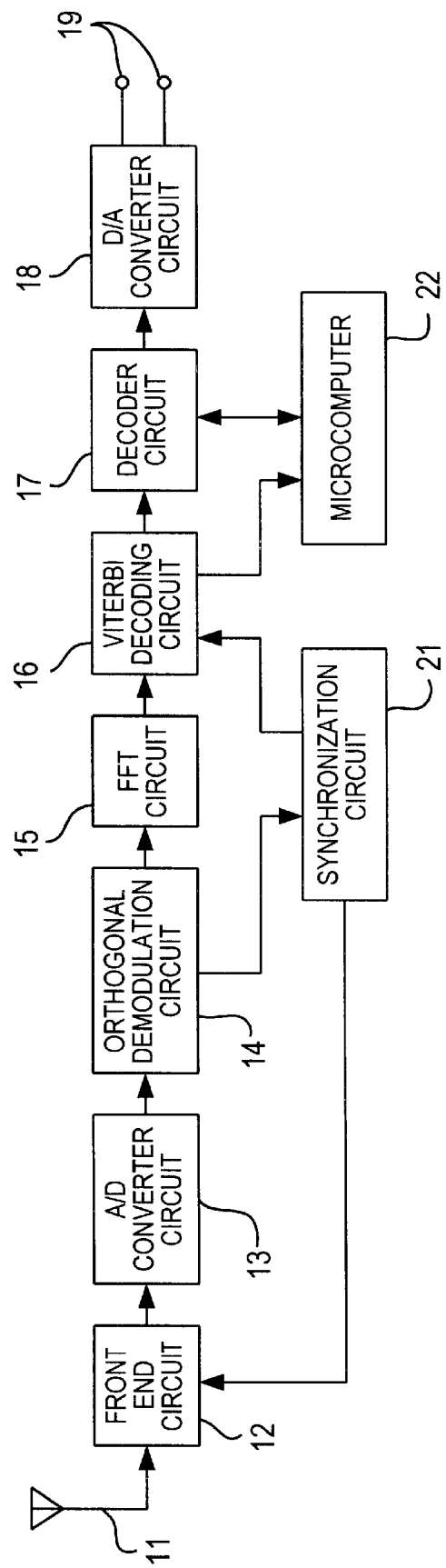

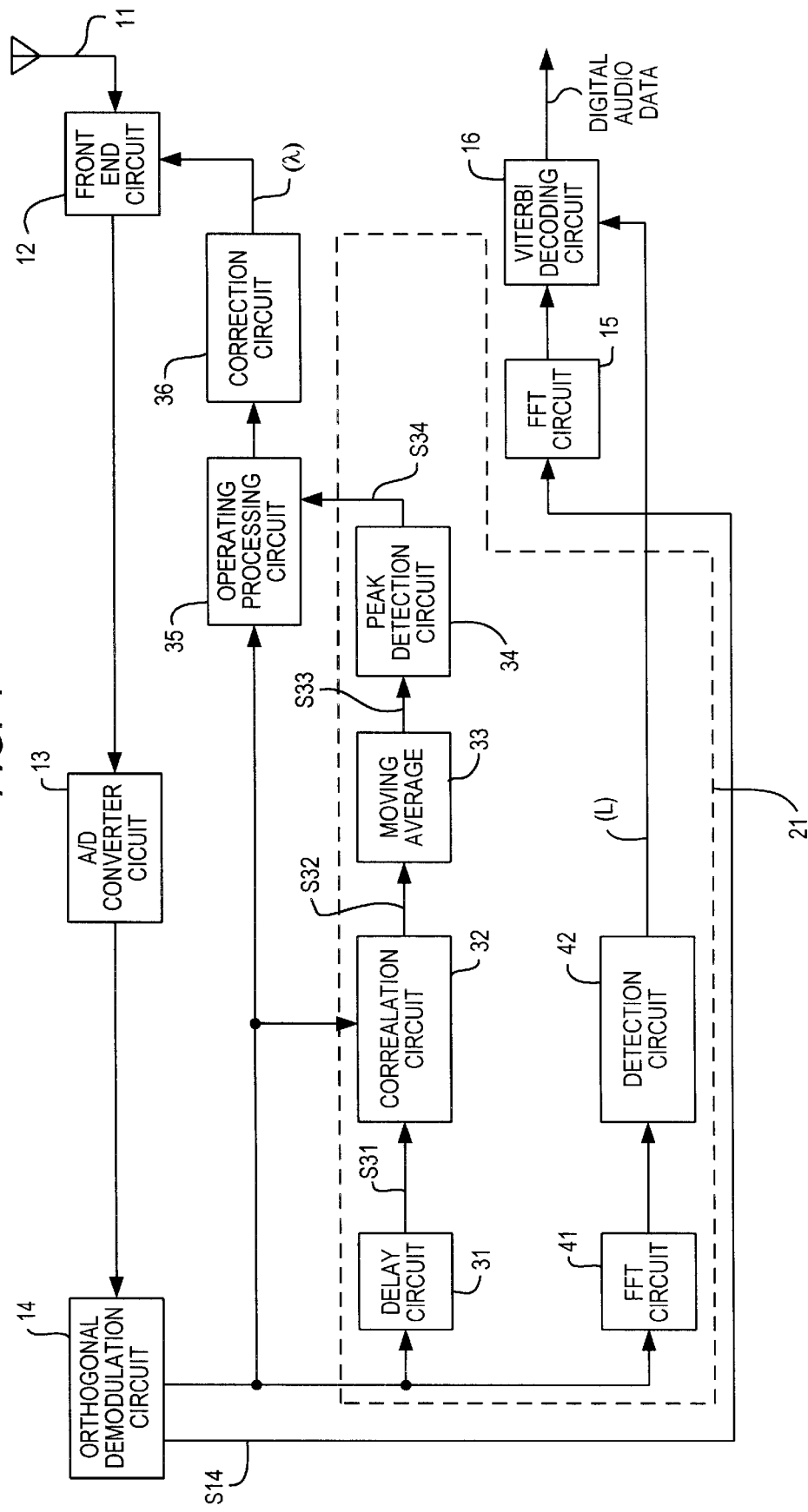

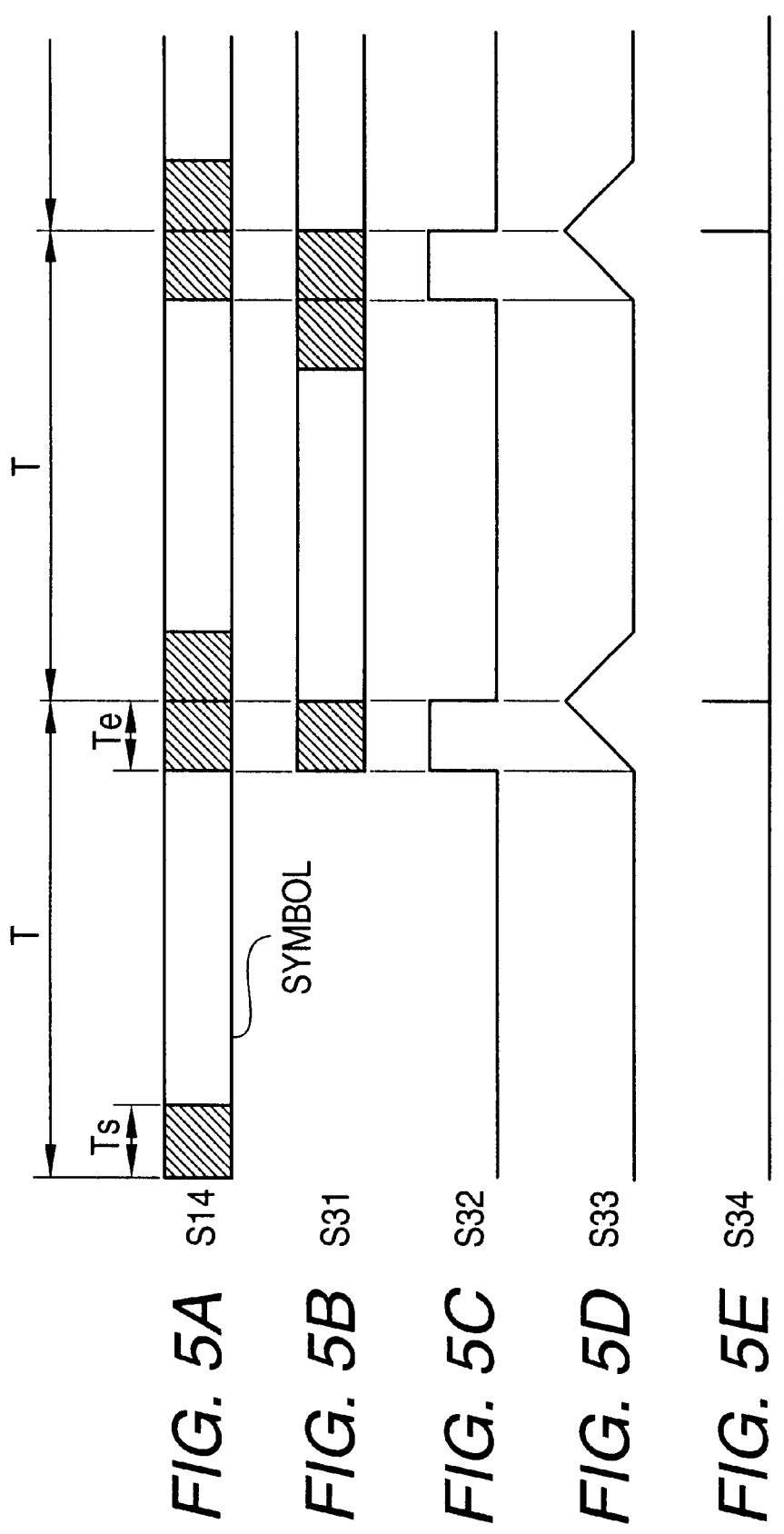

DIGITAL AUDIO BROADCASTING RECEIVER

BACKGROUND OF THE INVENTION

1. Field of the Invention

The present invention relates to a digital audio broadcasting "DAB" receiver.

2. Description of the Related Art

In Europe, DAB (digital audio broadcasting) according to the EUREKA 147 standard is now being practiced. In the DAB, a plurality of digital data are subjected to various encoding processes and finally converted to an OFDM (orthogonal frequency division multiplex) signal and the OFDM signal is transmitted. Digital data, such as digital audio data, of 64 channels (the maximum case) can be transmitted simultaneously.

FIG. 1A shows the structure of the OFDM signal on the time axis, which includes a plurality of frames that are arranged continuously. The DAB has four transmission modes, and FIG. 1A shows the structure of mode I in which one frame has a duration of 96 ms. Further, in mode I, each frame consists of 77 symbols. In each frame, the two head symbols constitute a sync channel and the subsequent three symbols constitute four fast information channels FIC, and the remaining 72 symbols constitute a main service channel MSC.

The sync channel is used to detect a frame phase and a deviation of the reception frequency (tuning frequency). The first symbol of the sync channel is a null symbol Null and the second symbol is a phase reference sync symbol TFPR. The null symbol Null in every other frame includes identification information TII for identifying a transmitting station, and nothing is transmitted in the interval of the null symbol Null in each of the remaining frames.

The fast information channels FIC serve to provide data relating to the main service channel MSC and other data. In mode I, each fast information channel FIC is divided into three fast information blocks FIB. Data relating to time, date, type, data arrangement, traffic message control, etc. are arranged in the fast information blocks FIB.

Digital audio data as main data and other various data are arranged in the main service channel MSC.

Further, as shown in FIG. 1B, each symbol has a structure that the head interval Ts having a predetermined duration is a guard interval as a guard in connection with the immediately preceding symbol and the remaining interval is an interval that is effective as a symbol. The contents of the interval Ts are made the same as the contents of a tail interval Te of the same symbol. Therefore, the intervals Ts and Te are the same also in duration. In mode I, the one symbol duration T=1,246 $\mu$s and Ts=Te=246 $\mu$s.

FIG. 2 shows the structure (also mode I) of the OFDM signal on the frequency axis. Many carrier components are distributed at regular intervals in the OFDM signal. In mode I, the number K of carrier components is 1,536 and the carrier spacing (frequency interval between adjacent carrier components) is 1 kHz. However, in any transmission mode, no carrier component exists at the position of the center frequency fc.

Transmission modes II–IV are different from mode I only in the frame duration and the size and the number of fast information channels FIC and fast information blocks FIB, and have the same basic structure as mode I. Therefore, modes II–IV will not be described any further. In the following description, specific values used are ones in mode I unless otherwise specified.

By the way, in mode I, since the carrier spacing of the OFDM signal is 1 kHz as described above, it is necessary that the reception frequency (tuning frequency) of the DAB receiver be locked in a certain frequency range (e.g., in this case, ±500 Hz) with respect to the DAB broadcast frequency. To this end, it is necessary that the reception frequency be synchronized with (i.e., tuned to) the broadcast frequency by locking the local oscillation frequency of the DAB receiver at a frequency that is deviated from the broadcast frequency by the intermediate frequency.

In the DAB receiver, the FFT (fast Fourier transform) is used to decode received data. In the FFT, it is necessary that FFT windows be correctly located in time with respect to symbols. That is, it is necessary to take synchronization in time.

In view of the above, in the DAB receiver, time synchronization and tuning are made according to the following procedure:

(1) A null symbol Null is detected.

(2) A sync symbol TFPR ensuing the null symbol Null is captured by using a detection result of item (1).

(3) The captured sync symbol TFPR is subjected to FFT.

(4) A frequency error L as defined with the carrier spacing used as the unit and a frequency error $\lambda$ less than L/2 are determined based on an FFT result.

For example, in mode I, L=2 and $\lambda$=0.3 if the reception frequency has an error 2.3 kHz.

(5) A time error is determined.

(6) The frequency and time errors are corrected by using results of items (4) and (5).

However, in the above method, processing relating to synchronization cannot be performed until a sync symbol TFPR is captured (item (2)). That is, the time required for items (1) and (2) is not a time necessary for the synchronization processing itself but is a wasteful time, and it elongates the time necessary for taking synchronization.

SUMMARY OF THE INVENTION

An object of the present invention is to substantially eliminate the time corresponding to the above items (1) and (2) and thereby shorten the time necessary for taking synchronization.

To attain the above object, the invention provides a digital audio broadcasting receiver comprising a delay circuit for delaying a received DAB signal by one symbol period minus a guard period; a correlation circuit for taking correlation between a delayed output of the delay circuit and the DAB signal; a moving average circuit for moving-averaging a correlation output of the correlation circuit over a width that is equal to the guard period; a peak detection circuit for detecting a position in time of a peak of a moving average output of the moving average circuit; a calculation circuit for calculating an error in a reception frequency based on a phase deviation in the DAB signal at the position in time that is indicated by a peak detection output of the peak detection circuit; an FFT circuit for subjecting the DAB signal to FFT; and a detection circuit for determining a reception center frequency based on an FFT output of the FFT circuit, wherein the error in the reception frequency is corrected by controlling a local oscillation frequency based on a calculation output of the calculation circuit; and wherein an error in the reception frequency is corrected by performing carrier shifting based on a detection output of the detection circuit.

Therefore, the time required for detecting a null symbol and the time required for capturing a sync symbol are not needed.

BRIEF DESCRIPTION OF THE DRAWINGS

FIG. 3 is a block diagram showing a DAB receiver according to an embodiment of the present invention;

FIG. 4 is a block diagram showing a sync circuit of the DAB receiver of FIG. 3; and FIGS. 5A–5E are time charts showing the operation of the sync circuit of FIG. 4.

DETAILED DESCRIPTION OF THE PREFERRED EMBODIMENT

Figure 1A:
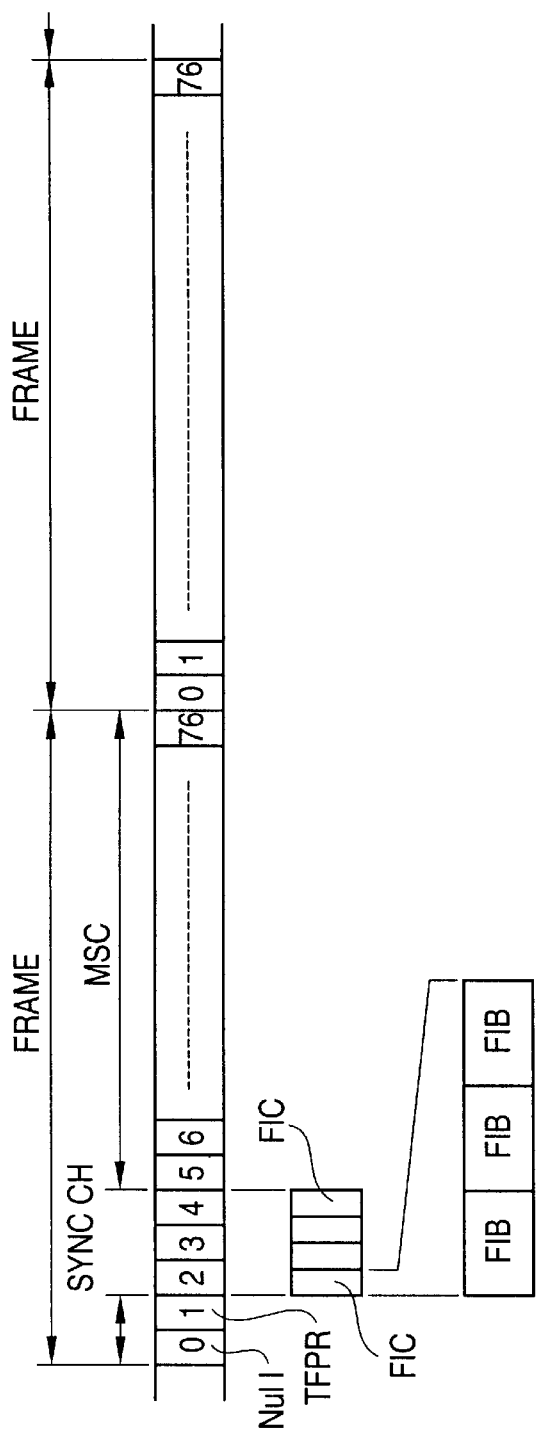
FIGS. 1A and 1B show the format of an OFDM signal of DAB.

As shown in FIG. 3, a DAB broadcast wave signal is received by an antenna 11. A resulting reception signal is supplied to a front end circuit 12 having a superheterodyne structure and is converted into an intermediate frequency signal there. The intermediate frequency signal is supplied to an A/D converter circuit 13 and converted into a digital signal there.

Then, the digital signal is supplied to an orthogonal demodulation circuit 14, where baseband I and Q component signals are obtained through demodulation. The I and Q component signals are supplied to a FFT circuit 15 and are OFDM-demodulated there. OFDM-demodulated data is supplied to a Viterbi decoder circuit 16, where data deinterleaving and error correction as well as program (channel) selection are performed, whereby digital audio data of a target program is selected.

Subsequently, the selected data is supplied to an audio decoder circuit 17 and subjected to data expansion there. Digital audio data of the target program is output from the decoder circuit 17 and supplied to a D/A converter circuit 18, where the data is D/A-converted to an analog audio signal there. The analog audio signal is output from terminals 19.

Further, a sync circuit 21 is provided for sync control. Supplied with I and Q component signals from the orthogonal demodulation circuit 14, the sync circuit 21 generates a correction signal for tuning, which is supplied to the front end circuit 12 and the Viterbi decoder circuit 16. The details of the sync circuit 21 will be described later.

A microcomputer 22 is provided for system control. The microcomputer 22 exchanges prescribed signals with the sync circuit 21 as well as with the Viterbi decoder circuit 16 and the audio decoder circuit 17.

For example, the sync circuit 21 is configured as shown in FIG. 4. That is, a signal S14 (including I and Q components) is output from the orthogonal demodulation circuit 14 as shown in FIG. 5A and supplied to a delay circuit 31, where a signal S31 that is delayed from the signal S14 by, for example, a period obtained by subtracting the tail guard period Te from one symbol period T (i.e., a period T–Te), is generated as shown in FIG. 5B. The signal S31 is supplied to a correlation circuit 32. The original signal S14 is also supplied to the correlation circuit 32.

Figure 1B:
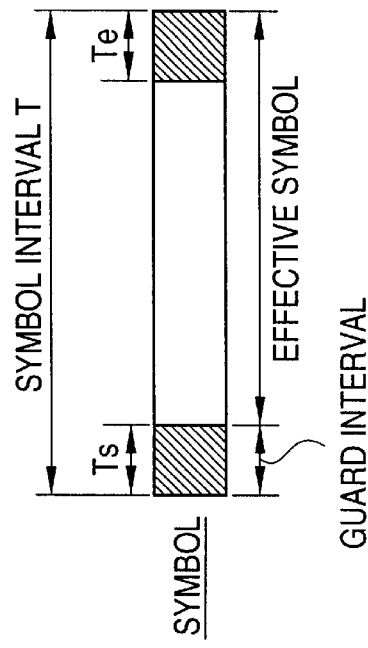
Figure 2:
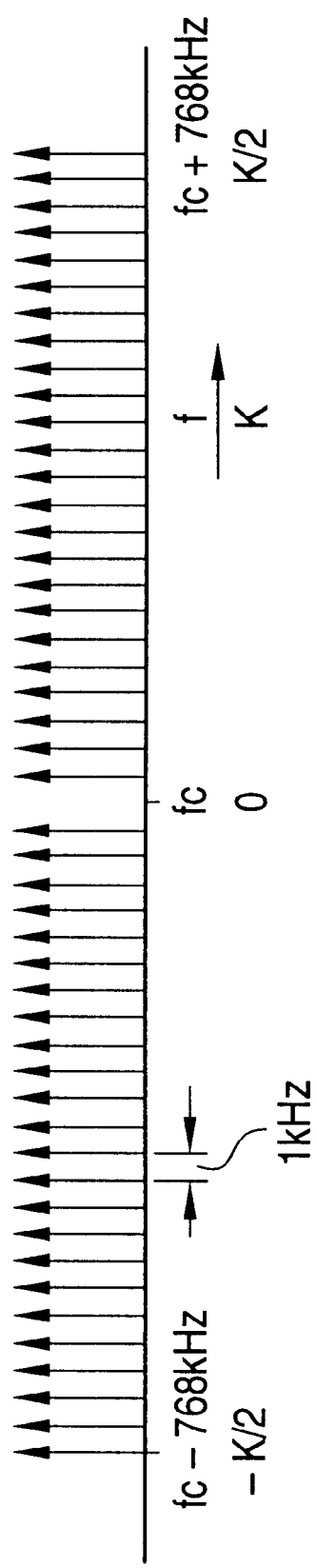
FIG. 2 shows the frequency spectrum of an OFDM signal.

As a result, as shown in FIGS. 5A and 5B, the position in time of the symbol interval Te of the signal S14 coincides with that of the symbol interval Ts of the signal S31. As described above in connection with FIG. 1B, the contents of the interval Ts are the same as the contents of the interval Te. Therefore, the correlation between the signal S14 and the signal S31 is strong in the interval Te of the signal S14 and weak in the other intervals. Therefore, as shown in FIG. 5C, an output signal S32 of the correlation circuit 32 has a high level in the interval Te of the signal S14 and a low level in the other intervals.

The signal S32 is supplied to a moving average circuit 33, where the signal S32 is moving-averaged over a width that is equal to the duration of the interval Ts. The moving average circuit 33 produces an output signal S33 that gradually increases in the interval Te of the signal S14 and thereafter gradually decreases as shown in FIG. 5D. The signal S33 is supplied to a peak detection circuit 34, where peak positions in time of the signal S33 are detected. In this case, as seen from FIGS. 5A and 5D, the peak positions in time of the signal S33 are end points of the intervals Te of the signal S14, that is, symbol end points of the signal S14. That is, symbols are continuously arranged in the signal S14 and an output signal S34 (see FIG. 5E) of the peak detection circuit 34 indicates boundary points between continuously arranged symbols.

Although the contents of the symbol interval Ts are the same as the contents of the symbol interval Te, an error corresponding to an error in the reception frequency signal, if any, with respect to the broadcast frequency occurs in the intermediate frequency. Therefore, even for the same symbol in the signal S14, a phase deviation occurs between a signal in the interval Ts and a signal in the interval Te. The magnitude of the phase deviation corresponds to the magnitude of the error in the reception frequency.

Based on the above understanding, the signal S14 is supplied to an operation processing circuit 35 and the signal S34 is also supplied to the operation processing circuit 35 as a timing signal showing symbol boundary points. The error in the reception frequency is calculated based on the phase deviation between the intervals Ts and Te of the same symbol of the signal S14, and a calculation result is supplied to a correction circuit 36, which outputs a signal indicating an error $\lambda$.

The signal indicating the error $\lambda$ is supplied to the front end circuit 12, whereby the local oscillation frequency is controlled so that $\lambda$ becomes zero, that is, it is controlled so as to have a polarity that will make the reception frequency the correct one.

The signal S14 that is output from the orthogonal demodulation circuit 14 is subjected to FFT in an FFT circuit 41 and then supplied to a detection circuit 42, where an error L in the reception frequency (center frequency fc) is detected by utilizing the fact that no carrier component exists at the position of the center frequency fc of an OFDM signal. A signal indicating the error L is supplied to the Viterbi decoder circuit 16, where a signal received from the FFT circuit 15 is carrier-shifted. That is, carrier components of the signal that is supplied to the Viterbi decoder circuit 16 are shifted by L.

Therefore, the above DAB receiver can receive a DAB broadcast wave signal at a correct reception frequency (tuning frequency).

In particular, the above DAB receiver corrects the reception frequency in the following manner:

(A) A value $\lambda$ is determined by utilizing correlation between symbol intervals Ts and Te.

(B) The reception frequency is corrected based on a result of item (A).

(C) An error in the reception frequency is detected by utilizing the fact that no carrier component exists at the position of the center frequency fc of an OFDM signal.

(D) The reception frequency is corrected based on a result of item (C).

That is, tuning is performed while symbols are detected. Therefore, the time for capturing a sync symbol TFPR by detecting a null symbol Null becomes substantially unnecessary and hence the time required for taking synchronization can be shortened.

In the above embodiment, the sync circuit 21 may be implemented by a DSP (digital signal processor). Another configuration is possible in which I and Q component signals are obtained by orthogonal-demodulating an intermediate frequency signal that is output from the front end circuit 12, then A/D-converted, and then supplied to the FFT circuit 15.

The invention makes it possible to shorten the time necessary for tuning in receiving a DAB signal.

What is claimed is:

1. A digital audio broadcasting receiver comprising:

a delay circuit for delaying a received digital audio broadcasting signal by a prescribed period;

a correlation circuit for taking correlation between a delayed output of the delay circuit and the received digital audio broadcasting signal and producing a correlation output;

a moving average circuit for moving-averaging the correlation output of the correlation circuit over a width that is equal to a guard period and producing a moving average output;

a peak detection circuit for detecting a position in time of a peak of the moving average output of the moving average circuit and producing a peak detection output;

a calculation circuit for calculating a first error in a reception frequency based on a phase deviation in the received digital audio broadcasting signal at the position in time that is indicated by the peak detection output of the peak detection circuit and producing a calculation output;

a fast Fourier transform circuit for subjecting the received digital audio broadcasting signal to fast Fourier transform processing and producing a fast Fourier transform output; and a detection circuit for determining a reception center frequency based on the fast Fourier transform output of the fast Fourier transform circuit and producing a detection output, wherein the first error in the reception frequency is corrected by controlling a local oscillation frequency based on the calculation output of the calculation circuit; and a second error in the reception frequency is corrected by performing carrier shifting based on the detection output of the detection circuit.

2. The digital audio broadcasting receiver according to claim 1, wherein the prescribed period is one symbol period minus the guard period.

3. The digital audio broadcasting receiver according to claim 1 or 2 wherein L represents the second error in the reception frequency as defined by using a frequency interval between carrier components as a unit, $\lambda$ denotes the first error in the reception frequency less than half of the frequency interval between carrier components, a signal indicating the first error $\lambda$ is obtained through calculation by the calculation circuit, the local oscillation frequency is controlled based on the signal indicating the first error $\lambda$, a signal indicating the second error L is obtained through detection by the detection circuit, and the carrier shifting is performed based on the signal indicating the second error L.

* * * * *